INVENTORS
ALBERT DI LORETO
EMILIO DI LORETO
PAUL ROMANO
CAMILLIO W. IPPOLITI
BY
ATTORNEY.

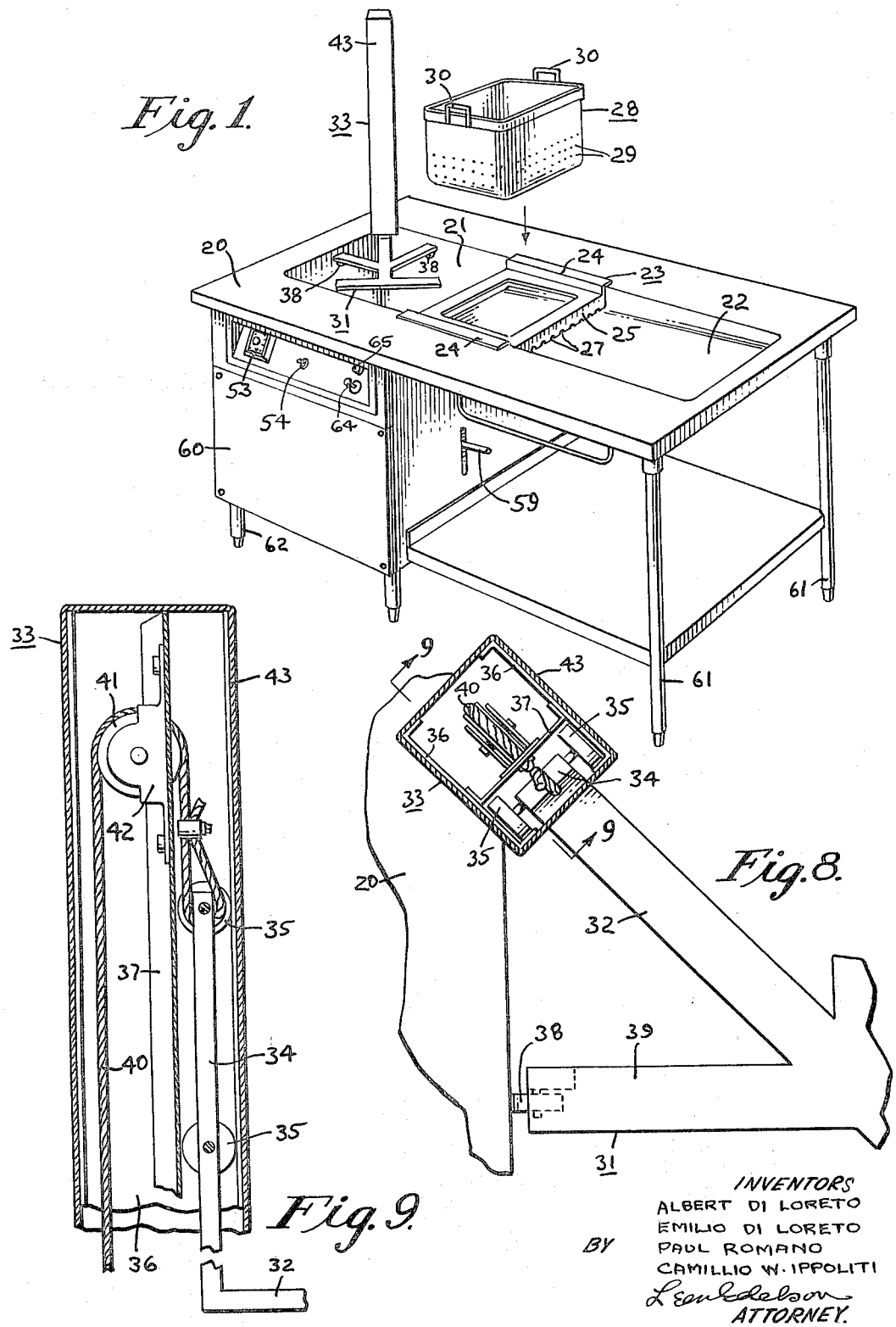

Dec. 27, 1966  A. DI LORETO ETAL  3,294,009
MEAT TENDERIZING APPARATUS
Filed April 20, 1965  4 Sheets-Sheet 3

INVENTORS
ALBERT DI LORETO
EMILIO DI LORETO
PAUL ROMANO
CAMILLIO W. IPPOLITI
BY Leo Edelson
ATTORNEY.

United States Patent Office 3,294,009
Patented Dec. 27, 1966

3,294,009
MEAT TENDERIZING APPARATUS
Albert Di Loreto, Philadelphia, Emilio Di Loreto, Clifton Heights, Paul Romano, Philadelphia, and Camillio W. Ippoliti, Ridley Park, Pa., assignors to Rodel Metal Mfg. Co., Philadelphia, Pa., a corporation of Pennsylvania
Filed Apr. 20, 1965, Ser. No. 449,588
9 Claims. (Cl. 99—254)

This invention generally relates to food processing apparatus, and more particularly relates to apparatus suitable for tenderizing meat in bulk quantities for subsequent packaging and delivery. The apparatus to be hereinafter described may be employed on a large scale by meat packing companies, and also has great utility when used by retailing establishments such as restaurants.

Briefly, the invention contemplates apparatus of a generally compact size which includes a bath of liquid meat tenderizing agent into which a quantity of meat may be immersed for a predetermined length of time sufficient to permit penetration of the meat tissue by the tenderizing agent and after the expiration of which time the meat is automatically removed from the bath. Facilities are provided for carrying out the tenderizing process while the meat to be treated is still in its frozen state so that meat thawing is not prerequisite and the process is economical of time. Means are additionally provided for draining the treated meat of excess liquid and returning the drained tenderizing liquid to the bath, the meat thereafter being packaged and, if desired, refrozen for storage prior to subsequent delivery or use. Typically, the liquid meat tenderizing bath is maintained at a temperature of sixty to sixty-five degrees Fahrenheit, and the frozen meat to be tenderized may be immersed in the bath for approximately five minutes. The tenderizing of unfrozen portions of meat would of course require substantially less immersion time since penetration of the meat by the tenderizing agent would occur more quickly.

A primary object of our invention is to provide novel meat tenderizing apparatus in a complete self-contained unit of relatively small size operable on a continuous basis to tenderize quantities of meat in batches by immersing the same for a predetermined length of time in a bath of liquid tenderizing agent.

Another object of our invention is to provide a novel meat tenderizing apparatus as aforesaid including selectivity actuatable means for immersing the meat to be treated into the bath, maintaining the meat in the bath for the desired length of time and then automatically removing the meat from the bath.

A further object of our invention is to provide novel meat tenderizing apparatus as aforedescribed including further facilities for removing excess tenderizing agent from the meat previously removed from the bath, returning such excess tenderizing liquid to the bath and providing facilities for thereafter packaging the treated meat.

Yet another object of our invention is to provide a novel meat tenderizing apparatus of simple configuration requiring a minimal disassembly for purposes of cleaning to maintain conditions of sanitation.

The foregoing and other objects of our invention will become clear from a reading of the following specification in conjunction with an examination of the appended drawings, wherein:

FIGURE 1 is a front perspective view from above of the novel apparatus according to the invention illustrating the meat holding basket spaced upwardly above the apparatus to reveal details which would be otherwise obscured;

FIGURE 8 is an enlarged fragmentary view partly in section and partly in plan of the basket elevating and lowering structure as would be seen when viewed along the line 8—8 of FIGURE 2;

FIGURE 9 is an enlarged vertical section through the basket assembly lift post as would be seen when viewed along the line 9—9 of FIGURE 8.

In the several figures, like elements are denoted by like reference characters.

Figure 3:
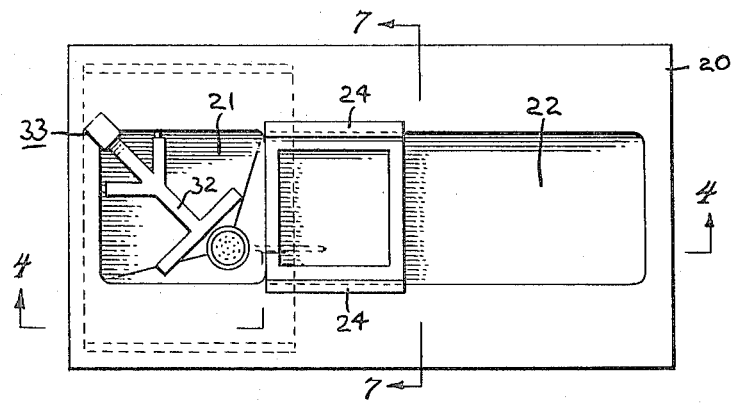
FIGURE 3 is a plan view of the apparatus according to the invention shown in FIGURES 1 and 2.

Referring now to the figures, consider first FIGURES 1 to 4 for details of the overall organization of the apparatus. The apparatus has a generally horizontal rectangular top surface 20 formed with a central rectangular depression including a tank or sink 21 of generally square horizontal cross section at the left hand end and from which extends toward the right in upwardly sloping fashion a drainboard or drain channel 22, the pitch of the flat drainboard 22 being sufficient to insure that any liquid deposited thereon runs toward the left and back into the tank 21. Disposed over the drainboard 22 and within the channel portion proximate to the tank 21 is a basket slide 23 of generally rectangular form having opposite side support runners 24 seated flatwise upon the front and rear aprons of the top surface 20 immediately adjacent to the drain channel 22, the support runners 24 carry a rectangular frame provided with a large central opening and downturned depending skirts 25 and 26 respectively remote from and proximate to the tank 21, skirt 25 being provided at its bottom edge with a series of serrations or notches 27 functioning as drain holes with the lower edge of the skirt approximately an ⅛ of an inch above the sloping surface of the drain channel 22.

Figure 4:
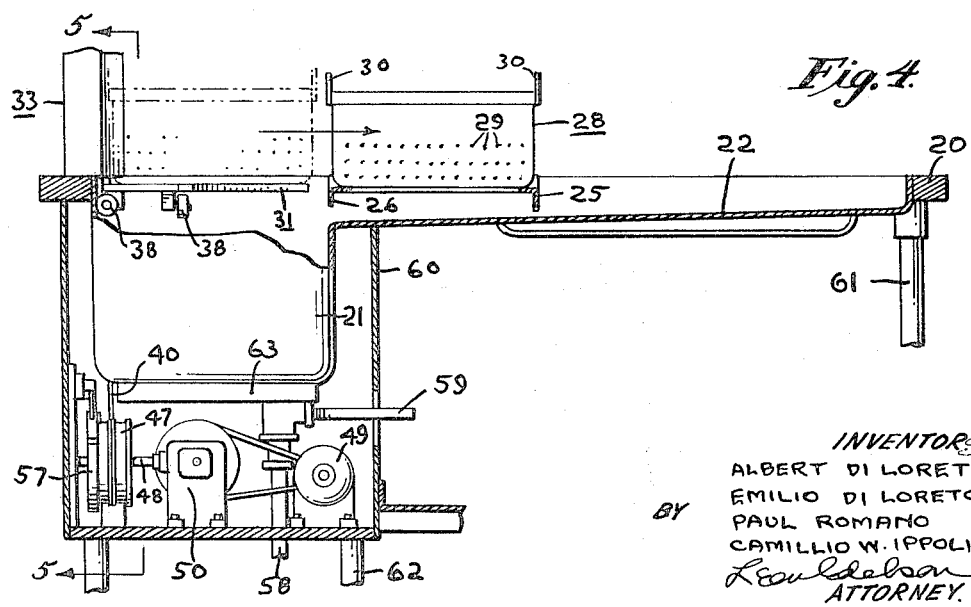
FIGURE 4 is a longitudinal vertical section taken through the apparatus as would be seen when viewed along the line 4—4 of FIGURE 3, and is on an enlarged scale.

As best seen in FIGURES 1 and 4, seatable upon the basket slide 23 is a basket 28 of generally rectangular parallelepiped form provided with a plurality of drain holes 29 about its sides and on the bottom and fitted with a pair of lifting handles 30 extending upward from a pair of opposite basket sides above the open top thereof. As best seen in FIGURE 4 the basket 28 is shiftable onto the basket slide 23 from its immediately adjacent and slightly elevated position on lift platform 31 which latter is disposed for vertical movement downward into and upward out of the tank 21.

Considering now also FIGURES 5 through 8, the lift platform 31 is observed to include a plurality of arms extending laterally from a main support arm 32 which extends diagonally from one corner of the tank 21 at which is rigidly secured an upstanding post structure 33. As best seen in FIGURE 9, the lift platform main support arm 32 turns upward at a right angle to become a part of a vertically extending trolley 34 having upper and lower horizontally extending axles upon opposite ends of which are fitted wheels 35. The trolley 34 is shiftable vertically within the post 33 on tracks formed by one flange of each of a pair of vertically extending parallel U-shaped channel members 36 spaced apart a distance slightly in excess of the width of the trolley device and fixedly intersecured substantially throughout their full length by another channel member 37 extending transversely therebetween with its side flanges respectively secured to the channel members 36.

From the FIGURES 8 and 9 it is therefore clear that the trolley structure 34 is confined within a vertically extending rectangular channel for rolling movement therewithin which is just sufficiently larger in cross section to permit free movement of the trolley but to prevent any substantial degree of play. The lift platform is mechanically stabilized by a pair of rollers 38 rotatably carried by platform arms extending for main support arm 32 in such fashion that the rollers engage adjacent sidewalls of the tank 21 for rolling movement vertically thereagainst as the lift platform 31 moves upward and downward out of and into the tank 21.

The upper end of trolley 34 has fixedly secured thereto one end of a cable 40 which extends upward, around and downward on the other side of a sheave 41 rotatably carried by a bracket 42 fixedly secured to central channel member 37, the cable 40 passing through a hole cut through the web of the channel member. The structural and functional parts of the post structure 33 are concealed by a slip-on cover having an open bottom and closed top, designated generally as 43, which conceals and protects the working parts of the lift post.

Figure 6:
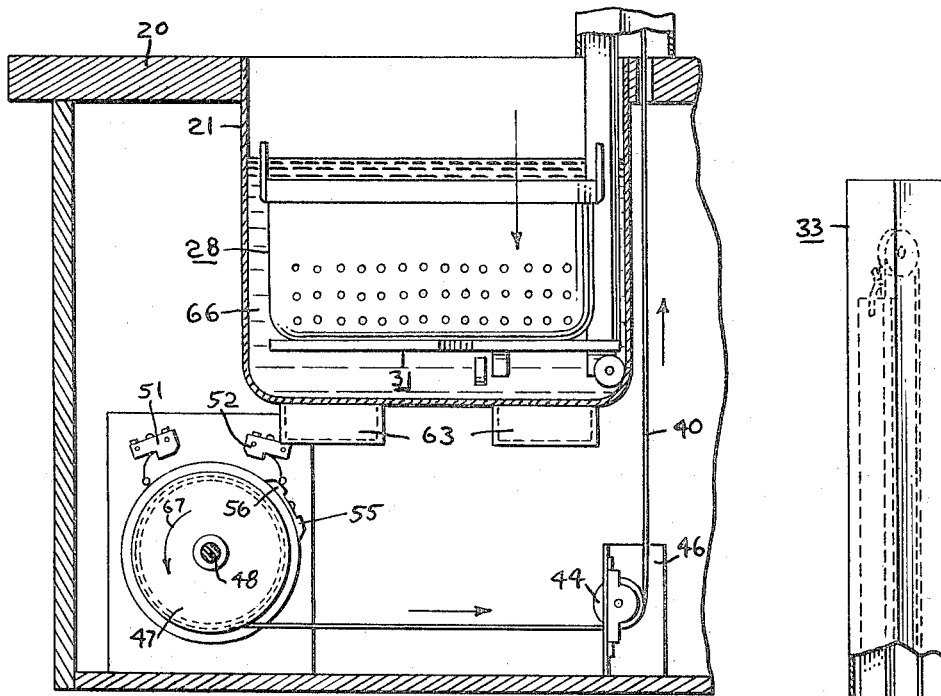
FIGURE 6 is a showing similar to that of FIGURE 5 but illustrating the basket lift assembly in its fully down position and showing the meat holding basket immersed within the liquid in the bath tank.
Figure 5:
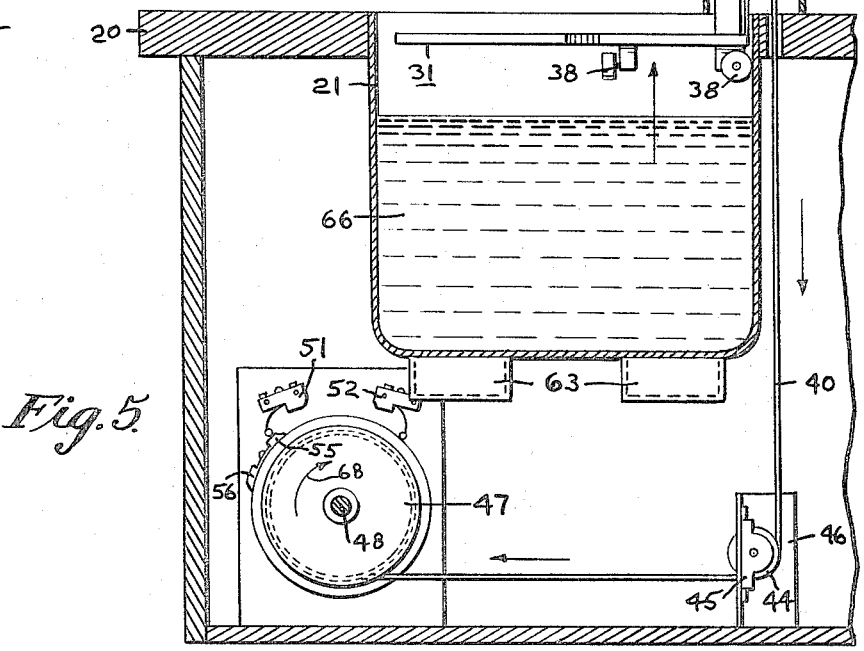
FIGURE 5 is an enlarged vertical section through the bath tank end of the apparatus as would be seen when viewed along the line 5—5 of FIGURE 4, and illustrates the meat holding basket lift assembly in its fully raised position.
Figure 7:
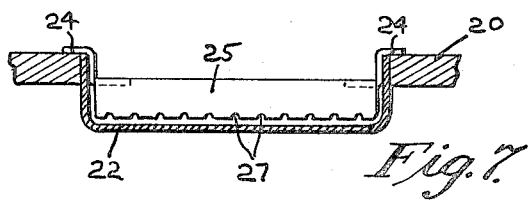
FIGURE 7 is an enlarged vertical cross section through the drain portion of the apparatus as would be seen when viewed along the line 7—7 of FIGURE 3 and showing the basket holding drain unit in end elevation.

As is perhaps best seen in FIGURES 4, 5 and 6, the cable 40 extends downward through the lift post 33 and top 20 and passes about a lower sheave 44 rotatably carried by a bracket 45 fixedly secured to an angle member 46, the latter being rigidly secured to the apparatus framing structure. The cable 40 extends forward from sheave 44 and is wrapped about and secured to a rotatable drum 47 fixed upon a shaft 48 rotatable by an electric motor 49 through a speed reducing coupling 50, the rotational speed of drum 47 being typically on the order of one revolution per minute when it is being driven. The motor 49 is of the reversible type and is actuated at the beginning and end of a cycle to initially lower the lift platform 31 by driving the drum as illustrated in FIGURE 6, and to thereafter raise the lift platform 31 by rotating the drum 47 in the opposite direction as illustrated in the showing of FIGURE 5. Operation of the motor 49 is controlled by the microswitches 51 and 52 best seen in FIGURES 5 and 6, and by the timing mechanism 53 and start switch 54 mounted on the front control panel shown in FIGURES 1 and 2. The micro-switches 51 and 52 are actuated, as observed in FIGURES 5 and 6 by the cams 55 and 56 physically secured upon the rim 57 of the cable drum 47.

Figure 2:
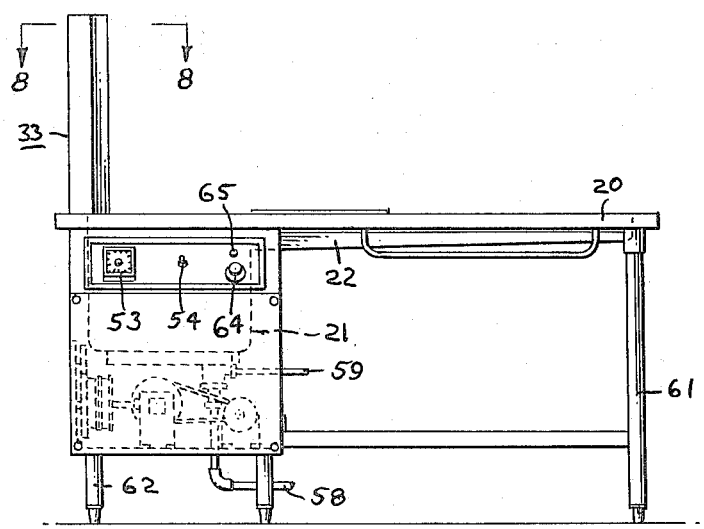
FIGURE 2 is a front view of the apparatus illustrated in perspective in FIGURE 1.

As best seen in FIGURES 2 and 4, the tank 21 is provided with a bottom outlet drain line 58 through which the liquid tenderizing agent may be run out of the tank 21 upon operation of the lever 59 to open the drain line. The tank 21, cable 40 and drum 47 together with the drum operating drive system and the wiring and control circuits are housed within an appropriate casework 60 to provide a protective and attractive enclosure. A plurality of supporting legs 61 and 62 establish the apparatus at the desired height above floor level.

Figure 10:
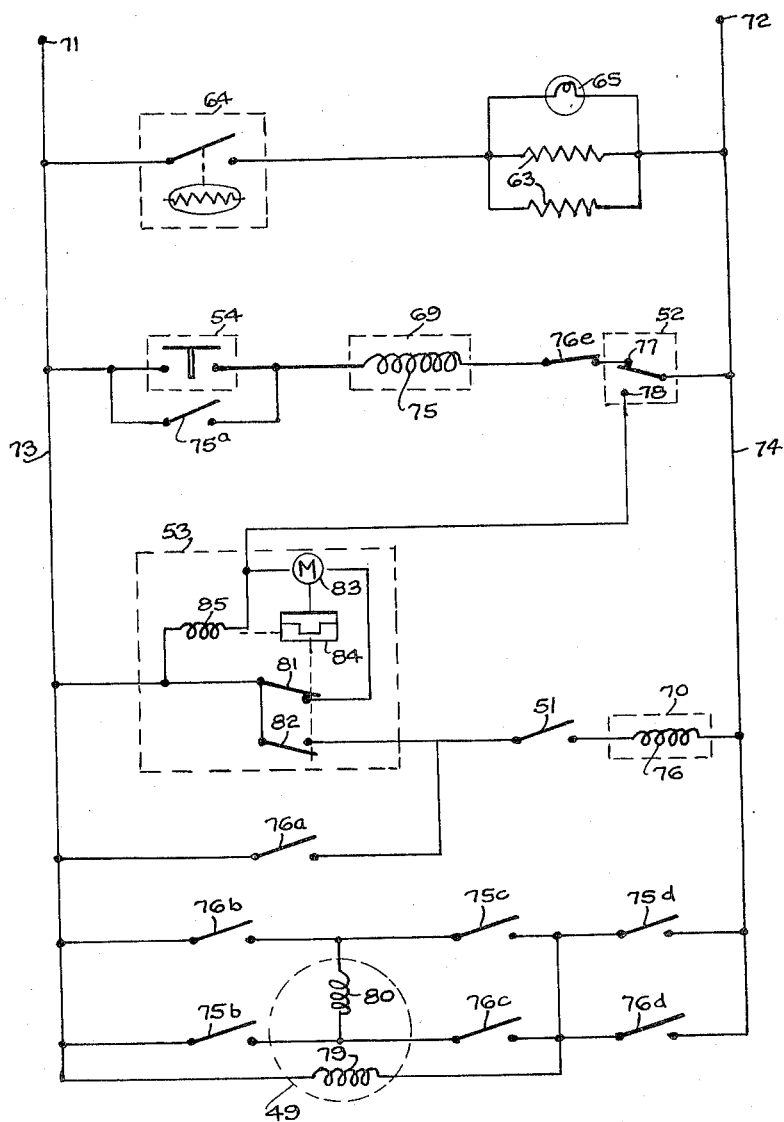
FIGURE 10 is a schematic diagram of the electrical circuitry utilized to operate the basket lift and lowering apparatus.

Physically secured to the underside of the tank 21 and in good thermal contact therewith are a pair of electrical heater elements 63 which are controlled by a thermostat 64 which latter is best seen in FIGURES 1 and 2, to maintain the temperature of the liquid tenderizing agent in the tank 21 at the desired temperature, which may typically be as aforesaid on the order of sixty to sixty-five degrees Fahrenheit. As seen in FIGURE 10 the heaters 63 are so arranged in electrical circuit with the thermostat 64 that they cycle on and off as is required to maintain the temperature, such cycling being independent of the circuitry associated with control of the lift platform vertical movement. An indicator light 65 is provided to give visual indication of when the heaters 63 are energized.

The apparatus functions in the following manner. Assume that the tank 21 has been filled with the liquid meat tenderizing agent 66 as seen in FIGURE 5 and that the heaters 63 have brought the liquid 66 to the desired predetermined temperature under the control of the thermostat 64, that the lift platform 31 is in its raised position as seen in FIGURES 1 and 5, and that the setting of the timer 53 has also been determined. The basket 28 may be placed upon the lift platform 31 and the meat to be tenderized may be for example removed from a cold locker or freezer and cut into portions of the desired size while still frozen. These frozen cuts are next placed in the basket 28 and the start switch 54 is actuated. As will be subsequently seen from the description of schematic electrical diagram of FIGURE 10, motor 49 is energized to drive the drum 47 in the direction indicated by arrow 67 of FIGURE 6 to thereby unwind cable 40 from the drum and permit trolley 35 to move downward within post 33 and thereby lower basket 28 on lift platform 31 downward into the liquid tenderizing agent 66.

When the basket 28 has been lowered, drum 47 has rotated to the point where cam 56 thereon operates micro-switch 52 to deenergize the motor 49 and terminate movement of the lift platform 31. The basket 28 remains in the tenderizing bath for the length of time determined by timer 53, after which the timer initiates the reenergization of motor 49 in such manner as to cause the motor to rotate in reverse direction and drive drum 47 as indicated by arrow 68 in FIGURE 5. This rotational movement of drum 47 winds cable 40 thereabout to thereby move lift platform 31 upward out of the bath 66 to its topmost position as shown in FIGURE 4 and FIGURE 5, deenergization of the motor 49 and termination of drum 47 rotation being effected through actuation of micro-switch 51 by means of cam 55 carried on the drum 47.

Basket 28 containing the tenderized meat cuts is now shifted over onto basket slide 23 as shown in FIGURE 4 and any liquid remaining in the basket continues to drain out through the holes 29 in the sides and bottom of the basket into drain channel 22 and hence back into the tank 21. When the major drainage has occurred, the contents of the basket 28 may be dumped into the drain channel 22 to the right of the basket slide 23 for final drainage. Solid particles of meat are prevented from draining back into the tank 21 by means of the strainer formed by notched depending skirt 25 of the basket slide 23. The tenderized meat cuts may of course now be wrapped either individually or in bulk as desired and may be stored for inventory or direct shipment either unfrozen or frozen as desired.

The basket 28 is of course ready for reuse and may be immediately refilled. Alternatively, two baskets may be employed in such manner that a second loaded basket is immersed in the tank 21 as soon as the first basket has been moved onto basket slide 23 to thereby eliminate or minimize non-productive time for the tenderizing apparatus. Periodically the tank 21 may be drained of the liquid tenderizing agent 66 by actuation of the drain operating lever 59 which opens the well drain and permits the liquid agent to flow out through the drain line 58.

FIGURE 10 is an electrical schematic diagram which illustrates the electrical interconnections between the motor 49, micro-switches 51 and 52, timer 53, switch 54, all previously shown in the drawings, together with motor start "down" relay 69 and motor start "up" relay 70. All of this circuitry, as well as the heater and thermostat circuitry, is energizable from a source of electrical power connectable to terminals 71 and 72 which respectively feed supply lines 73 and 74. Down relay 69 includes an actuator coil 75 and four normally open single pole switches 75a through 75d, these switches all becoming closed by an actuator when coil 75 is energized. Relay 70 includes a relay coil 76 which when energized actuates relay switches 76a through 76e, 76e being normally closed while the switches 76a through 76d are normally open when coil 76 is deenergized.

Micro-switch 51 is a single pole, single throw switch while micro-switch 52 is a single pole, double throw switch having a normally closed contact 77 and a normally open contact 78. Motor 49 is of the synchronous type and is provided with a start winding 79 and a run winding 80, start winding 79 always being connected in the circuit in the same sense while run winding 80 is electrically reversible by means of the relay switches to effect reverse rotations of the motor 49 at different parts of the operating cycle. Timer 53 includes a normally closed switch 81 and a normally open switch 82 mechanically coupled to an electrically energizable motor 83 through a clutch mechanism 89 rendered operative by electrically energizable clutch coil 85.

The circuit conditions illustrated in FIGURE 10 correspond to the mechanical conditions of FIGURE 5 in which the lift platform 31 is in its up position, micro-switch 51 being held open by cam 55 and all of the electrical circuits being deenergized. The operating cycle is initiated by closing momentary-make start switch 54 to energize coil 75 of motor start "down" relay 69 through closed switch 76e and contact 77 of micro-switch 52. Energization of relay 69 closes relay switches 75a through 75d. Switch 75a bypasses start switch 54 and establishes a holding circuit for maintaining relay 69 energized. Switch 75d energizes start winding 79 of motor 49 while the closing of switches 75b and 75c energize run winding 80 of motor 49 for motor rotation operative to lower the lift platform 31.

Rotation of the drum 47 disengages the cam 55 from micro-switch 51 to thereby close the micro-switch and condition the up relay 70 for actuation under the control of the timer 53. The motor 49 continues to drive the drum 47 until the lift platform 31 is at the lower position in the tank and the cam 56 actuates micro-switch 52 to transfer its pole from contact 77 to contact 78, thus deenergizing down relay 69 and causing switches 76a through 75d to open and thereby deenergize drive motor 49.

The transfer of the pole of micro-switch 52 to contact 78 thereof energizes timer motor 83 through normally closed timer contact 81 and also energizes timer clutch coil 85 to engage clutch 84 and cause timer motor 83 to mechanically drive an actuator toward the switches 81 and 82. After the predetermined time interval has elapsed during which the lift platform 31 has remained at the bottom of the tank 21, the motor driven timer actuator closes timer switch 82 and thereafter opens timer switch 81. The opening of switch 81 deenergizes the timer motor 83 which remains mechanically coupled to the switches through clutch 84 because clutch coil 85 remains energized. The timer switches 81 and 82 are thereby held in their now transferred positions and up relay 70 coil 76 is energized through now closed timer switch 82 and micro-switch 51.

Energization of relay 70 opens relay switch 76e to thereby lock-out down relay 69, and closes up relay switches 76a through 76d. Switch 76a provides a holding circuit for up relay 70 which is needed when timer switch 82 opens prior to termination of the up cycle. Switch 76d causes energization of the start winding 79 of motor 49, while closure of switches 76b and 76c energize run winding 80 of the motor 49 to produce motor rotation in the opposite sense to that produced by actuation of the down relay 69. Energization of motor 49 begins counter-rotation of the drum 47 which disengages cam 56 from micro-switch 52 and permits the micro-switch pole to disconnect from contact 78 and reengage contact 77, thereby deenergizing timer clutch coil 85 and thereby decoupling timer motor 83 from the actuator for timer switches 81 and 82. These timer switches being spring loaded now return to their initial conditions as illustrated in FIGURE 10, that is closure of switch 81 and opening of switch 82.

Up relay 70 holding switch 76a now maintains the relay energized while open switch 76e disables the start switch 54 to prevent actuation of down relay 69 prior to completion of the up cycle. When drum 47 has again rotated around to the position illustrated in FIGURE 5, cam 55 opens the contact of micro-switch 51 to thereby deenergize up relay 70, closing relay switch 76e and opening relay switches 76a through 76d to deenergize the drive motor 49 and restore all of the electrical conditions illustrated in FIGURE 10. A new cycle of operation may now be initiated when desired by again closing start switch 54.

While the apparatus of the present invention has been illustrated and described as being adapted for use particularly for the tenderizing of meats, it will be understood that the present invention is not limited to such special use but instead may well be adapted for the processing of all kinds and character of foods wherein the product to be prepared requires immersion in a heated liquid. Also, it will be understood that the present invention is susceptible of various changes and modifications which may be made from time to time without departing from the real spirit or general principles thereof, and it is accordingly intended to claim the same broadly, as well as specifically, as indicated in the appended claims.

What is claimed to be new and useful is:

1. Apparatus for liquid treating articles comprising in combination,
   (a) an open-topped tank having sidewalls and a bottom wall adapted for receiving liquids and holding the same without leakage,
   (b) a drain channel having a pair of opposite sidewalls and a bottom wall sloping at an angle to the horizontal toward the said tank and emptying thereinto below the top of the tank and at the drain channel lower end,
   (c) open bottom support means adapted to support a liquid pervious receptacle above said drain channel, whereby liquid draining from said receptacle passes into said channel and is returned to said tank,
   (d) a receptacle supporting platform of smaller dimensions when viewed in plan than the dimensions of the tank open top, and means supporting said platform for movement downward into said tank from an upper position adjacent to said liquid pervious receptacle support means to a lower position proximate to the tank bottom and for return movement upward out of said tank to the said upper position, and
   (e) selectively operable means coupled to said platform effective when actuated to automatically lower said platform into said tank, measure a predetermined time interval, and then raise said platform to its original position.

2. Apparatus for liquid treating articles comprising in combination,
   (a) an open topped tank having sidewalls and a bottom wall adapted for receiving liquids and holding the same without leakage,
   (b) a liquid pervious receptacle adapted to hold articles to be liquid treated and disposable within said tank,
   (c) means supporting said receptacle for movement downward into said tank from an upper position above the normal liquid level of the said tank to a lower position where said receptacle is immersed in the tank held liquid and for return movement upward out of said tank to the said upper position, (d) selectively operable control means coupled to said receptacle supporting means effective when actuated to automatically lower said receptacle into said tank, measure a predetermined time interval, and then raise said receptacle to its original position.

3. The apparatus as described in claim 2 further including electrically energizable heat generating means in good thermal contact with said tank effective when energized to heat the liquid in said tank, and thermostatic control means in electric circuit with said heat generating means operative to automatically energize and deenergize the latter as required from a source of electric energy to maintain the temperature of the tank liquid within a predetermined desired range.

4. The apparatus as set forth in claim 2 wherein said receptacle supporting means includes a platform fixedly secured to a trolley which is disposed for vertical shifting movement within an enclosure secured to said apparatus adjacent to said tank, said platform being provided with low friction bearing means engageable with the inside surface of at least two of said tank walls effective to mechanically stabilize said platform as it is moved downward into and upward out of said tank.

5. The apparatus as set forth in claim 2 wherein said receptacle supporting means includes a platform fixedly secured to a trolley which is disposed for vertical shifting movement within an enclosure secured to said apparatus adjacent to said tank, said platform being provided with low friction bearing means engageable with the inside surface of at least two of said tank walls effective to mechanically stabilize said platform as it is moved downward into and upward out of said tank, said trolley being mechanically coupled to an electrically energizable reversible motor which comprises part of said control means and when energized for rotation in a forward sense first causes said trolley to shift said platform downward into said tank and when energized for reverse rotation then moves said trolley to shift said platform upward out of said tank, said control means also including timing means in electric circuit with said electrically reversible motor operative to cause the latter to be energized for reverse rotation at a predetermined time after its initial rotation in the said forward sense.

6. Apparatus for liquid treating articles comprising in combination,
(a) a tank for holding a liquid bath, and a sloping drainboard extending laterally therefrom and emptying thereinto,
(b) a liquid pervious receptacle adapted to hold articles to be liquid treated,
(c) first support means adapted to support said receptacle in spaced overlying relation to said drainboard and immediately adjacent to said tank, whereby liquid draining from said receptacle passes into said channel and is returned to said tank,
(d) second support means adapted to support said receptacle for movement downward into said tank from an upper position above the normal liquid level of the said tank to a lower position where said receptacle is immersed in the tank held liquid and for return movement upward out of said tank to the said upper position, the upper position of said second support means being immediately laterally adjacent to the said first support means so that said receptacle may be laterally shifted from said second support means to said first support means.

7. The apparatus as described in claim 6 further including electrically energizable heat generating means in good thermal contact with said tank effective when energized to heat the liquid in said tank, and thermostatic control means in electric circuit with said heat generating means operative to automatically energize and deenergize the latter as required from a source of electric energy to maintain the temperature of the tank liquid within a predetermined desired range.

8. The apparatus as described in claim 6 wherein said drainboard extends away from said tank for a distance beyond said first support means so that the contents of said receptacle can be discharged onto said drainboard, said first support means being provided with strainer means extending downward toward said drainboard effective to prevent the discharged articles from moving down said drainboard and back into said tank but operative to permit any residual liquid to return to said tank.

9. The apparatus as described in claim 6 further including selectively operable control means coupled to said second support means comprising an electrically energizable reversible motor and timing means in an electric circuit effective when actuated to automatically lower said receptacle into said tank from its said upper position to its said lower position, measure a predetermined time interval, and then raise said second support means to its said upper position, said electric motor effecting first lowering of said second support means by motor rotation in one direction and then raising thereof by motor rotation in the opposite direction after lapse of the time interval under control of said timing means.

References Cited by the Examiner

UNITED STATES PATENTS

| | | | |
|---|---|---|---|
| 1,506,113 | 8/1924 | Dearings | 99—336 |
| 1,849,457 | 3/1932 | Johns | 99—234 |
| 2,299,080 | 10/1942 | Back | 99—234 |
| 3,225,681 | 12/1965 | Wells | 99—336 |

WALTER A. SCHEEL, *Primary Examiner.*

R. W. JENKINS, *Assistant Examiner.*